March 13, 1951     E. MITTELMANN     2,545,370
METHOD AND MACHINE FOR MAKING RUBBER COATED STEEL BELTS
Filed Jan. 7, 1948
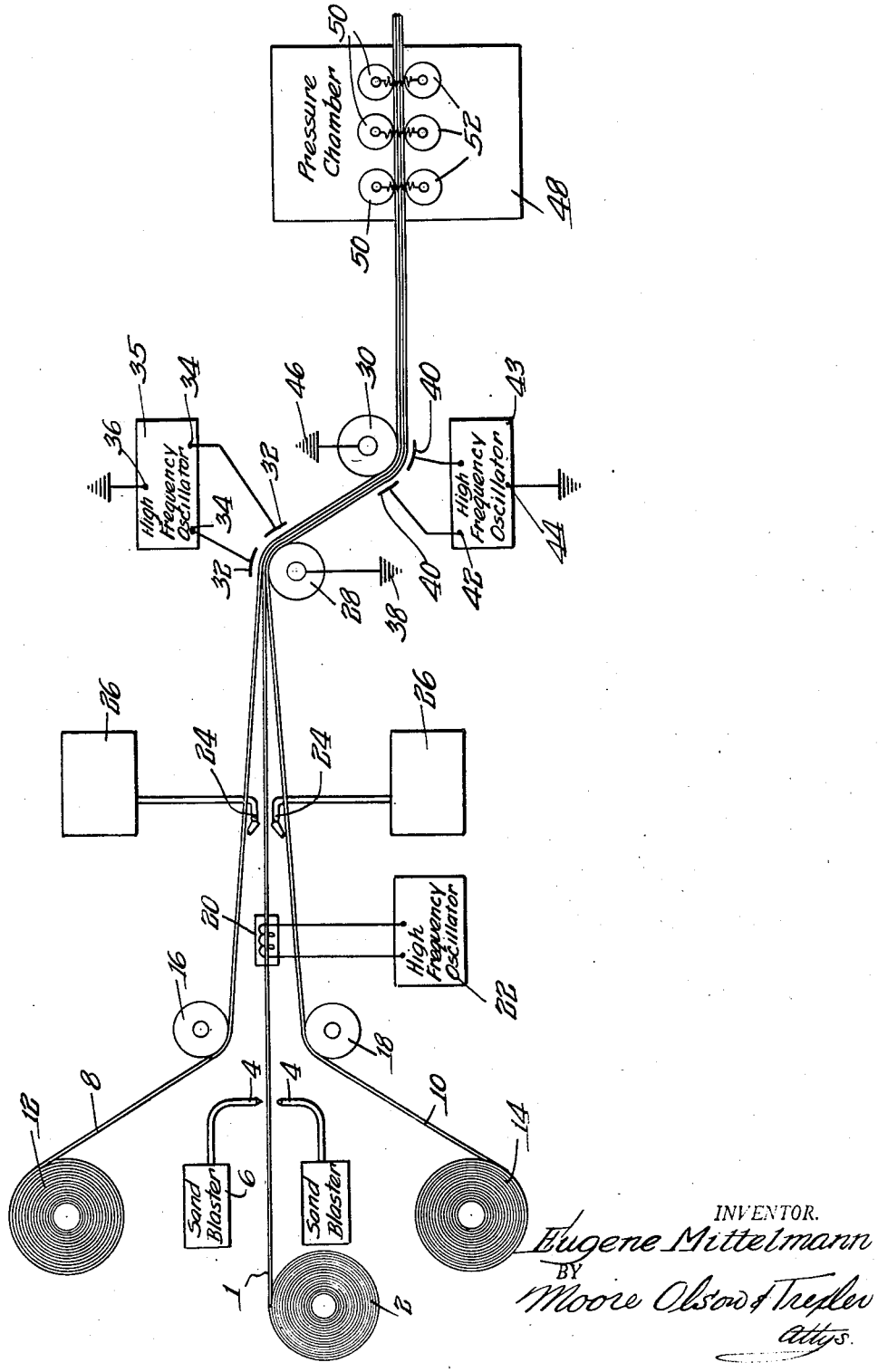
INVENTOR.
Eugene Mittelmann
BY
Moore Olson & Trexler
attys.

Patented Mar. 13, 1951

2,545,370

UNITED STATES PATENT OFFICE 2,545,370

METHOD AND MACHINE FOR MAKING RUBBER COATED STEEL BELTS

Eugene Mittelmann, Chicago, Ill., assignor to Sandvik Steel, Inc., New York, N. Y., a corporation of New York Application January 7, 1948, Serial No. 964

8 Claims. (Cl. 154—3)

This invention relates to a method and machine for making rubber coated steel belts. Heretofore it has been customary to produce rubber coated steel belts by an intermittent process and the rate of production was constantly quite low and the process and necessary machinery was quite involved.

It is accordingly an object of the invention to provide a continuous method, and a machine therefor, for producing a steel belt to which a coat of rubber or similar material is firmly and permanently bonded on one side or on both sides.

It is a further object of the invention to provide a method, and a machine therefor, for producing rubber coated steel belting at a greatly increased rate of production while at the same time improving the curing of the rubber coating and more efficiently bonding the rubber to the steel belt lining.

Other and further objects of the invention are to provide a method and machine for producing rubber coated steel belting at a lower cost and to more effectively utilize in the production of such belting the space available for the production thereof and further, to reduce the number of manufacturing steps to a minimum.

Other and further objects and advantages of the invention will be apparent from the following description when taken in connection with the accompanying drawing which consists of a diagrammatic illustration of a method and machine for manufacturing rubber coated steel belts in accordance with the present invention.

The best method heretofore developed for manufacturing rubber coated steel belts involved an intermittent process in which the steel belt was copper plated, then coated with some thermosetting cement and a layer of cured rubber applied to the cement covered belt and held under heat and pressure for a predetermined length of time. This process permitted the manufacture of the article at a slow rate of production and was not entirely satisfactory either in the quality of the rubber coating or the efficiency of the bond between the rubber coating and the steel belt. A number of attempts have been made to use uncured rubber in that process and to heat the rubber-cement-steel under pressure simultaneously to cure the rubber and to cause setting of the cement to bond the rubber to the steel. These attempts did not produce a satisfactory article because it was found that the setting temperature of the cement was rather critical and to secure that necessary temperature the outer layer of the uncured rubber, because of the temperature gradient required to bring the cement up to the necessary temperature, was overcured. Attempts to eliminate overcuring by slower heating methods further decreased the rate of production of the article and the necessary accuracy of control of the temperature of the heating element and the times of application of the heat and pressure were so critical that the percentage spoiled made the process impractical.

In accordance with the present invention the steel strip 1 is fed from a supply roller 2 by any convenient, continuous conveyor, first between the nozzles 4 of sand blasters 6, the nozzles 4 being positioned on opposite sides of the moving steel strip so as to clean the surface of the strip to prepare it for the proper adhesion of the rubber coating.

Partly or semi-cured rubber strips 8 and 10 are fed from feeder or supply rolls 12 and 14 over guide rolls 16 and 18 by any convenient, continuous conveyor, not shown. The steel strip 1 passes from the cleaning nozzles 4 through the heater coil 20 which may be of any suitable form known to the art. The heater coil 20 is supplied with high frequency current by any suitable known high frequency oscillator 22. The rubber strips 8 and 10 pass from the guide rollers 16 and 18 past applicators 24 of spray or brushing devices 26 which apply a coating of a suitable thermosetting cement to the inner surface of each strip. Any thermosetting cement the setting temperature of which is substantially the same as the curing temperature of the rubber stock may be employed.

After passing the applicators 24, the rubber strips converge upon the steel strip and are diverted laterally over a guide roller 28 then again diverted laterally over a guide roller 30. As the juxtaposed strips pass over the roller 28, the outer surface of the rubber strip 8 is carried in juxtaposition to a pair of metal electrodes or plates 32 preferably curved concentric to the axis of the roller 28 and spaced longitudinally of the path of movement of the strips as they pass over the roller. The electrodes 32 are connected to high frequency output terminals 34 of a high frequency oscillator of any suitable type providing output terminals 34 of instantaneous opposite polarity and a grounded output terminal 36. The roller 28 not only forms a guide roller for the strips but also serves as a common electrode grounded as at 38, for the active electrodes 32. The electrostatic field, which is created by the electrodes 32, 28 extends for the most part substantially lengthwise of the rubber strip 8 and serves to heat the continuously moving strip and the cement coating applied to its under surface to a temperature which is substantially uniform throughout the cross section of the strip and the cement coating.

As the strips pass over the roller 30 the outer surface of the strip 10 passes in juxtaposition to a pair of metal plates or electrodes 40 similar to the electrodes 32 and similarly connected to the terminals 42 of a high frequency oscillator 43, the oscillator also being of any suitable construction providing the terminals 42 of instantaneous opposite polarity and a grounded terminal 44. The roller 30 is also grounded as at 46 to cooperate with the electrodes 40. The electrodes 30 and 40 provide an electrostatic field which extends substantially lengthwise of the strip 10 to heat the strip 10 and its cement coating to a uniform temperature throughout its entire cross section.

On leaving the roller 30 the strips move into and through a pressure chamber 48 and in that chamber pass between opposite spring pressed rollers 50 and 52 which supply the proper pressure for curing of the rubber and cement. In order to maintain the strips at the proper temperature during their travel through the pressure chamber, the rollers 50 and 52 are heated by radiation which may be supplied by infrared lamps or by resistance heating units of conventional structure, not shown.

It will be evident that the steel strip 1 may be sand blasted to clean its opposite surfaces either before or after it is pre-heated by the induction heating coil 20 and that the sand blast equipment may be replaced by any other cleaning apparatus suitable for cleaning a continuously moving steel strip.

The pre-heating of the steel strip by induction heating coil 20 prevents the transfer of heat from the rubber strips and the cement coatings during the next heating step when the rubber strips and the cement coatings are heated to the curing and setting temperatures by the high frequency dielectric heating equipment. This insures a uniformity of heating of the strips and the cement coatings and prevents the development of a temperature gradient between the inner and outer surfaces of the strips and the coatings.

The rate of production of rubber coated steel belting is greatly increased by this continuous method of manufacture and the uniformity of quality in the manufactured articles is greatly increased.

If it is desired to make steel belting coated with rubber on only one side the sand blaster 6, the spray or brush devices 26, and the dielectric heating unit on the side of the strip which is to remain uncoated may be eliminated or left unused.

It will be obvious that changes may be made in the form, construction and arrangement of the parts without departing from the spirit of the invention or sacrificing any of its advantages, and the right is hereby reserved to make all such changes as fairly fall within the scope of the following claims.

What is claimed is:

1. A method of making rubber coated steel belting which consists of continuously feeding a flexible steel strip having a width considerably greater than its thickness and a rubber strip along converging paths, cleaning the surface of the steel strip on the side to which the rubber strip converges and in advance of the point of convergence, inducing high frequency current into the steel strip in advance of the point of convergence to pre-heat the strip, coating the surface of the rubber strip on the side toward the steel strip with a thermosetting cement and in advance of the point of convergence, creating an electrostatic field extending lengthwise of the strip and cement coating on convergence of the rubber strip with the steel strip and while the steel strip remains at an elevated temperature from the pre-heating step and applying compressive pressure to the entire width of the converged strips and adding heat to maintain the strip at a predetermined temperature for a predetermined length of time as the strips move continuously to cure the rubber and set the cement.

2. A method of making rubber coated steel strip which comprises continuously conveying a flexible steel strip having a width considerably greater than its thickness and a rubber strip along converging paths, pre-heating the steel strip in advance of the point of convergence, applying a thermosetting cement to the inner surface of the rubber strip in advance of the point of convergence, simultaneously heating the rubber strip and the cement coating by a high frequency dielectric field to a rubber curing and cement setting temperature, and thereafter applying compressive pressure to the entire width of the converged strips, and concurrently supplying sufficient heat to prevent lowering of the temperature of the rubber strip and cement coating, for a predetermined length of time to cure the rubber and set the cement as the strips are moving continuously.

3. A method of making rubber coated steel strip which comprises continuously feeding a flexible steel strip having a width considerably greater than its thickness and a rubber strip along converging paths, sand blasting the inner surface of the moving steel strip in advance of the point of convergence, pre-heating the steel strip by high frequency induced currents in advance of the point of convergence, applying a thermosetting cement to the inner surface of the rubber strip in advance of the point of convergence, heating the rubber strip and the cement coating by a high frequency dielectric field, as the strip moves continuously, and applying compressive pressure to the entire width of the converged strips and concurrently supplying sufficient heat to prevent a drop in temperature of the rubber strip and the cement coating.

4. A method of making steel strip having rubber coatings on its opposite surfaces which comprises continuously feeding a flexible steel strip having a width considerably greater than its thickness and two rubber strips on opposite sides of the steel strip toward a point of convergence, cleaning the opposite surfaces of the steel strip in advance of the point of convergence, pre-heating the steel strip by high frequency induced current in advance of the point of convergence, applying a thermosetting cement to the inner surfaces of the rubber strips in advance of the point of convergence, heating the rubber strips and the cement coatings by high frequency dielectric fields extending substantially lengthwise of the path of movement of the strips, and applying compressive pressure to the entire width of the converged strips from the outer surfaces of the rubber strips and concurrently adding heat to maintain the strips at a predetermined temperature for a predetermined length of time as they are continuously fed to cure the rubber and set the cement.

5. In a machine for making rubber coated steel strips, means for continuously feeding a steel strip and a rubber strip along converging paths, means for cleaning the surface of the steel strip on the side to which the rubber strip converges and in advance of the point of convergence, means for inducing high frequency current into the steel strip in advance of the point of convergence to pre-heat the strip, means for coating the surface of the rubber strip on the side toward the steel strip with a thermosetting cement and in advance of the point of convergence, means for creating an electrostatic field extending lengthwise of the rubber strip and cement coating on convergence of the rubber strip with the steel strip and while the steel strip remains at an elevated temperature from the pre-heating and means for concurrently applying compressive pressure to the entire width of the converged strips and adding heat to maintain the strips at a predetermined temperature for a predetermined length of time as the strips move continuously to cure the rubber and set the cement.

6. In a machine for making rubber coated steel strip, means for continuously conveying a steel strip and a rubber strip along converging paths, means for pre-heating the steel strip in advance of the point of convergence, means for applying a thermosetting cement to the inner surface of the rubber strip in advance of the point of convergence, means for simultaneously heating the rubber strip and the cement coating by a high frequency dielectric field to a rubber curing and cement setting temperature, means thereafter applying compressive pressure to the entire width of the converged strips, and means for supplying heat to prevent lowering of the temperature of the rubber strip and cement coating for a predetermined length of time to cure the rubber and set the cement as the strips are moving continuously.

7. In a machine for making rubber coated steel strip, means for continuously feeding a steel strip and a rubber strip along converging paths, means for sand blasting the inner surface of the steel strip in advance of the point of convergence, means for pre-heating the steel strip by high frequency induced currents in advance of the point of convergence, means for applying a thermosetting cement to the inner surface of the rubber strip in advance of the point of convergence, means for heating the rubber strip and the cement coating by a high frequency dielectric field, as the strip moves continuously, and means for concurrently applying compressive pressure to the entire width of the converged strips and supplying heat to prevent a drop in temperature of the rubber strip and the cement coating.

8. In a machine for making steel strip having rubber coatings on its opposite surfaces, means for continuously feeding a steel strip and two rubber strips on opposite sides of the steel strip toward a point of convergence, means for cleaning the opposite surfaces of the steel strip in advance of the point of convergence, means for pre-heating the steel strip by high frequency induced current in advance of the point of convergence, means for applying a thermosetting cement to the inner surfaces of the rubber strips in advance of the point of convergence, means for heating the rubber strips and the cement coatings by high frequency dielectric fields extending substantially lengthwise of the path of movement of the strips, and means for concurrently applying compressive pressure to the entire width of said strips from the outer surfaces of the rubber strips and adding heat to maintain the strips at a predetermined temperature for a predetermined length of time as they are continuously fed to cure the rubber and set the cement.

EUGENE MITTELMANN.

REFERENCES CITED

The following references are of record in the file of this patent:

UNITED STATES PATENTS

| Number | Name | Date |
| --- | --- | --- |
| 1,235,425 | Bradshaw | July 31, 1917 |
| 1,972,307 | Loetscher | Sept. 4, 1934 |
| 1,978,586 | Lamplough | Oct. 30, 1934 |
| 2,017,071 | Minor | Oct. 15, 1935 |
| 2,312,058 | Youmans et al. | Feb. 23, 1943 |
| 2,374,515 | Walton et al. | Apr. 24, 1945 |
| 2,389,725 | Gillis et al. | Nov. 27, 1945 |
| 2,390,863 | Amidon et al. | Dec. 11, 1945 |
| 2,393,541 | Kohler | Jan. 22, 1946 |
| 2,407,354 | Walton et al. | Sept. 10, 1946 |
| 2,423,902 | Peterson | July 15, 1947 |